United States Patent [19]

Lyon

[11] 4,340,487
[45] Jul. 20, 1982

[54] PROCESS FOR PURIFYING WATER

[76] Inventor: Michael R. Lyon, 800 N. Atlantic, Kansas City, Mo. 64116

[21] Appl. No.: 219,886

[22] Filed: Dec. 24, 1980

[51] Int. Cl.³ .............................................. C02F 1/52
[52] U.S. Cl. .................................. 210/705; 210/712; 210/797
[58] Field of Search ............... 210/712, 721, 722, 723, 210/724, 783, 788, 704, 705, 797, 798, 792

[56] References Cited

U.S. PATENT DOCUMENTS

| | | |
|---|---|---|
| 181,695 | 8/1876 | Lyman . |
| 1,426,596 | 9/1922 | Peck . |
| 1,696,846 | 12/1928 | Imhoff . |
| 2,261,924 | 11/1941 | Pittman et al. . |
| 2,885,080 | 5/1959 | Goldman . |
| 2,999,597 | 9/1961 | Harms . |
| 3,096,279 | 7/1963 | Komline . |
| 3,171,800 | 3/1965 | Rice et al. ............................ 210/722 |
| 3,171,804 | 3/1965 | Rice ...................................... 210/724 |
| 3,225,928 | 12/1965 | Black . |
| 3,313,795 | 4/1967 | Rubin . |
| 3,674,151 | 7/1972 | Freeland . |
| 3,792,773 | 2/1974 | Ross ...................................... 210/712 |
| 4,007,117 | 2/1977 | Smith et al. . |
| 4,059,516 | 11/1977 | Heisey . |
| 4,061,568 | 12/1977 | Hall . |
| 4,146,471 | 3/1979 | Wyness ............................ 210/788 X |
| 4,192,743 | 3/1980 | Bastgen et al. ....................... 210/712 |

Primary Examiner—Thomas G. Wyse
Attorney, Agent, or Firm—Fishburn, Gold and Litman

[57] ABSTRACT

A process is provided for removing suspended solids from a waste water stream exiting from a wet rendering plant, a centrifugal rendering plant and/or a hide curing brine system before the stream enters a public sewer system. Such waste water typically has some oils, fats and/or protein particles in addition to easily settled solids previously removed therefrom. The waste water is delivered to a holding tank wherefrom the waste water is drawn and pH adjusted with sodium carbonate, sodium hydroxide, or the like. Air is injected into the pH adjusted waste water along with flocculating agent such as ferric sulfate. Thereafter, the waste water is injected at a relatively low velocity into a flotation tank wherein flocculated wet solids urged upwardly by the injected air are allowed to float to the top of the tank and water which is relatively low in suspended solids and biological oxygen demand is removed from the lower portion of the tank and is pH adjusted and sent to a sewer. The wet solids are allowed to overflow the top of the flotation tank onto a dual continuous belt filter or the like. In the filter liquids contained within the wet solids are removed therefrom forming a relatively liquid free solids cake. The cake is scraped from the filter and collected. Water from the holding tank without substantial flocculated solids therein is used to selectively wash the filter so as to remove solids not removed with the cake which would otherwise tend to plug same. The wash water with the solids washed from the filter therein is then returned to the holding tank for additional processing.

7 Claims, 1 Drawing Figure

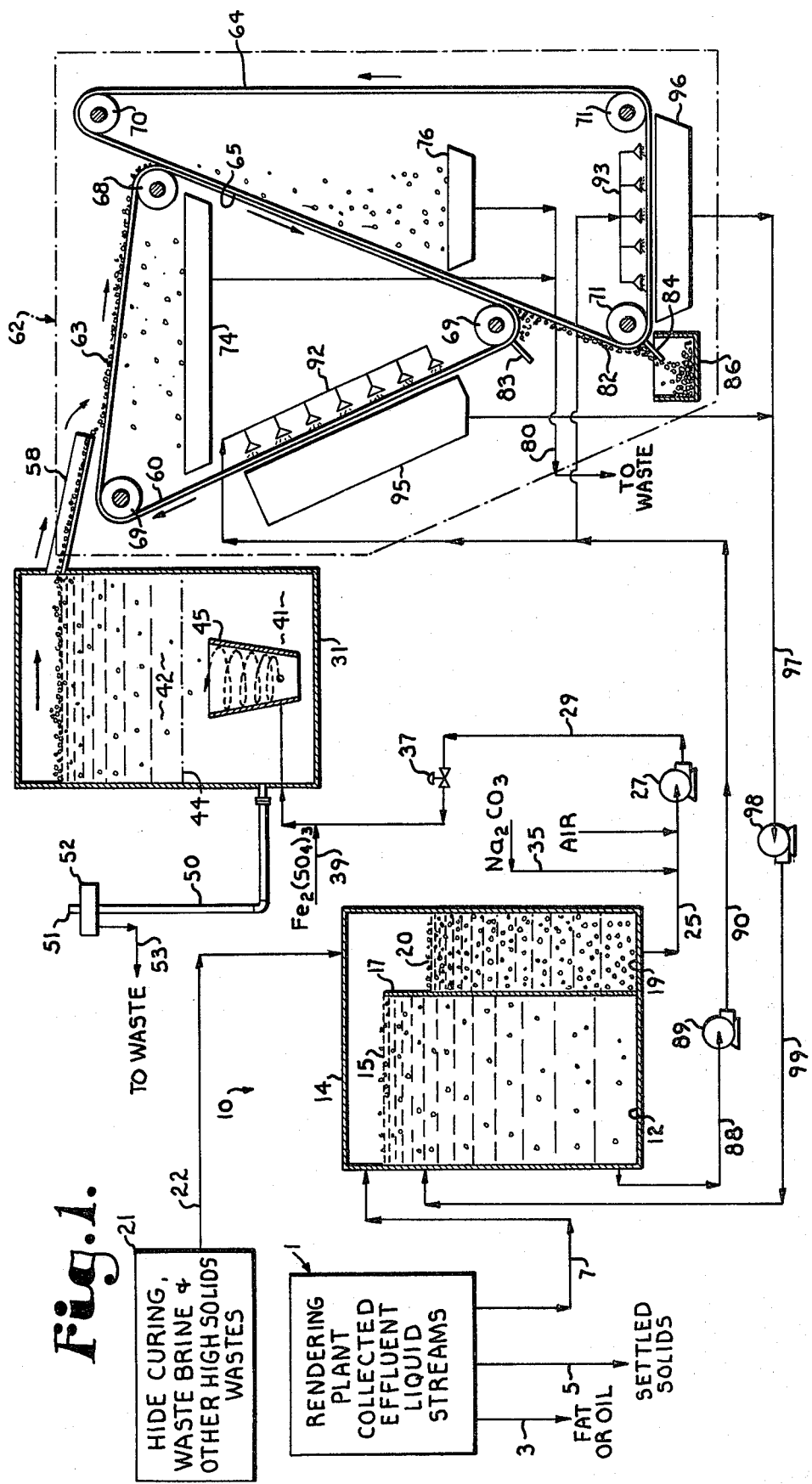

PROCESS FOR PURIFYING WATER

BACKGROUND OF THE INVENTION

The present invention relates to a process for removing impurities from a fluid stream, in particular, the present invention is directed to removing suspended solids from a waste water stream exiting a wet rendering plant, a centrifugal rendering plant, a hide brine curing system, or the like.

A common by-product of essentially every rendering or hide curing type process is a water stream containing substantial quantities of fat or oil, protein material, and solids. A number of processes have been developed for recovering fat from such water streams and for removing solids which are easily settled out of such streams. Examples of such processes are included in the patents of Lee R. Lyon, PROCESS FOR OBTAINING OIL FROM ANIMAL HIDES U.S. Pat. Ser. No. 3,338,931, PROCESS FOR SEPARATING AND RECOVERING FATS AND SOLIDS, U.S. Pat. Ser. No. 3,352,841, and PROCESSING OF OFFAL OR THE LIKE FOR OBTAINING SEPARATED FAT AND PROTEIN MATERIAL THEREFROM, U.S. Pat. Ser. No. 3,352,842. While conventional processes have proved satisfactory in the past for removing certain contaminents or impurities in a water stream sent to the sewer or the like, stricter environmental regulations and a typically increased cost of despositing suspended solids into a sewer system, have demonstrated a need to remove additional suspended solids from waste water streams which have not been removed by previous conventional processes.

When utilized in rendering plants, the process according to the present invention typically is directed to treating waste water with substantial portions of fat, protein, and easily settled solids previously removed therefrom. Such waste water resulting from rendering processes is commonly referred to as "stick-water." The process is also directed to treating waste brine effluent streams from the brine curing of hides and the offending impurities within the waste water typically include fat, protein, suspended dirt and manure solids removed from such hides during the curing process.

Conventional wet rendering and centrifugal rendering plant waste water treatment processes typically tend to fail to remove the suspended solids and such solids often by-pass the conventional water treatment or cleaning processes within the plant. Therefore, the present process has been developed to remove such suspended solids. It should be noted that even where local laws and regulations allow inclusion of suspended solids and biological oxygen demanding substances (BOD) within a waste water stream, that there is often an additional sewage charge based upon the amount of suspended solids and BOD within such flow streams. Further, most local laws and regulations prohibit the discharge of any fats and oils or the like in excess of a relatively very small percentage of the liquid effluent and, because of this, the typical rendering plant effluent is often in violation of such local laws.

Therefore, it is advantageous to remove as high a percentage as possible of such suspended solids. It is also noted that the suspended solids in the waste water stream have typically not lent themselves to filtration processes, basically because a large portion of the suspended solids is composed of particles typically too small to filtrate and/or the volume of particles to be removed makes fine filtration impracticle, even after removal of agglomerated particles by other methods. Thus, such filters tend to be clogged or plugged, and even flocculated solids tend to pass or squeeze through filter media, when effluent is passed through the filter in large quantities, such that the filter media must be relatively porous.

OBJECTS OF THE INVENTION

Therefore, the principle objects of the present invention are: to provide a process and apparatus for the removal of a substantial portion of suspended solids, BOD, fat, oil and the like from a fluid stream; to provide such a process wherein the fluid is waste water from a rendering or hide curing process wherefrom a substantial portion of fat and settled solids have been previously removed; to provide such a process wherein the waste water is pH adjusted or buffered, aerated, treated with a flocculating agent, and allowed to separate into a low suspended solids phase and a high wet solids phase; to provide such a process wherein the wet solids are delivered to a continuous belt-type filtration system such that liquids are removed therefrom and a solid cake is formed wherefrom useful products may be recovered upon re-rendering thereof; to provide such a system wherein material which tends to plug the filter belt is washed therefrom by a stream of substantially non-flocculated waste water which is then returned to near the start of the process; to provide such a process which is relatively simple and inexpensive to use; to provide such as apparatus for carrying out the process which is simple in design, relatively inexpensive to manufacture, economical in use, and particularly well adapted for the proposed usage thereof.

Other objects and advantages of this invention will become apparent from the following description taken in connection with the accompanying drawings wherein are set forth by way of illustration and example, certain embodiments of this invention.

SUMMARY OF THE INVENTION

Waste water is collected from effluent streams which contain a substantial quantity of suspended solids therein. Although the embodiment described herein discloses treatment of waste water withdrawn from a rendering and/or hide brine curing plant, it is foreseen that other types of waste water could be treated by the present process, for example, waste water from metal finishing and metal plating operations. The waste water is temporarily stored in a holding tank. Waste water with suspended solids therein is withdrawn from the holding tank and buffered or pH adjusted by a compatible agent such as sodium carbonate, sodium hydroxide, or the like. The adjusting agent normally will keep the pH of the waste water sufficiently high to prevent metal corrosion and may tend to soften the waste water and to buffer a later added flocculating agent so as to improve later flocculation and separation of the suspended solids from the remainder of the waste water. The pH adjusting agent is especially important in acting as a buffer to prevent strong swings especially low swings, in pH. Thereafter, the flocculating agent is added to the waste water stream and may include conventional flocculating agents such as ferric chloride, alum, various polymers, and other substances well known to those skilled in the art, and preferably is ferric sulfate since part of the solids recovered may be utilized in proteinaceous tankage.

After injection of the flocculating agent into the waste water stream, the stream enters a separation or flotation vessel. The flotation vessel contains an upper phase which comprises a relatively high percentage of flocculated suspended solids and a lower phase which comprises a fluid having a relatively low percentage of suspended solids therein. Preferably, the incoming waste water stream enters the flotation vessel interior of and generally tangential to an open ended arcuate distribution surface, such as a cylindrical or conical surface, positioned centrally or laterally with respect to the side wall of the flotation vessel and within the liquid phase which is relatively low in suspended solids. It is desirous to maintain a low velocity of the fluid within the flotation vessel and to eliminate as much as possible any agitation thereof so as to improve separation between the two phases and avoid shearing or separation of agglomerated floc.

The lower phase in the flotation tank is allowed to overflow an exterior stand pipe, adjustable weir, or the like so as to control the interface level between the two phases relative to the height of the flotation vessel. The wet solids in the upper portion of the flotation tank are allowed to overflow therefrom onto a filter having filter media. The filter is preferably of a continuous belt type, such as a dual continuous belt filter or a vacuum continuous belt filter wherein a porous belt comprises the filter media. While on the belt, a substantial portion of the liquid in the wet solids is removed therefrom and a substantially dry cake of solids is formed at the end of the belt. The solids cake is collected and may be re-rendered into fat and protein components or sold for the protein content thereof. The liquid removed from the wet solids is sent to the sewer or the like.

The belt is typically a woven synthetic or other porous type belt which is easily occluded or plugged by various components of the solids, particularly fat and proteinaceous solids. Simple scraping or doctoring of the solids cake from the belt typically fails to remove a substantial portion of the occluding material such that the filter becomes inefficient for removing liquid from the wet solids, since liquids cannot pass easily therethrough. To overcome this problem, waste water is pumped from the holding tank through a series of nozzles so as to backflush the belt and remove the material occluding the pores therefrom. Water used in the backflush is thereafter returned to the holding tank and eventually reprocessed through the system according to the present invention. In this manner the fluid utilized to clean the belts which is high in suspended solids is not sent directly to the sewer.

The water utilized in the backwash process preferably is withdrawn from a portion of the holding tank which is relatively low in flocculated solids, but does include solids which are small and independent particles suitable for passing through the filter without being trapped thereby. In this manner the filter or belt can be backwashed without collecting a significant amount of material from the backwash stream on the rear side of the belts. Such utilization of the untreated water substantially reduces fresh water usage by a rendering plant, if such fresh water is utilized to wash filters, as flow rates for washing filters may be in the nature of hundreds of gallons per minute. Also when compared to using fresh water or even clarified water to wash filters, the present use of the untreated waste water to wash the filters substantially reduces solids from going to the sewer, since such solids in the present process are returned to the start of the process for removal therein. It is noted that fresh or clarified water utilized to wash the filters could be returned to the start of the process but, because this would substantially increase volume of water to be treated, this would require substantial increase in the size of the equipment used in the process with consequent increase in cost.

The drawings constitute a part of this specification and include exemplary embodiments of the present invention and illustrate various objects and features thereof.

BRIEF DESCRIPTION OF THE DRAWINGS

FIG. 1 is a schematic flow diagram of an apparatus and process according to the present invention for treatment of waste water containing suspending solids, portions of which are exaggerated in scale to show detail thereof.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific processing, structural and functional details disclosed herein are not to be interpreted as limiting, but merely as a basis for the claims and as a representative basis for teaching one skilled in the art to variously employ the present invention in virtually any appropriately detailed process and structure.

Referring to the particular embodiment shown in FIG. 1, the reference numeral 1 generally designates various collected streams of water which have been contaminated with nonaqueous substances in a wet rendering plant, a centrifugal rendering plant, or the like. The collected stream, as designated by the box having the reference numeral 1, generally have oils or fat, as indicated by the flow stream 3, and settled solids, as indicated by the flow stream 5, previously removed therefrom. A water stream typically containing anywhere from 25,000 to 150,000 parts per million of suspended solids exits the rendering plant though suitable flow means such as are illustrated by the conduit or line 7. The liquid stream in line 7 with suspended solids therein enters the water purifying process 10 according to the present invention. Typically, the stream in line 7 will contain emulsified or disolved fats and proteins, or the like.

The liquid stream in line 7 enters a first stage 12 of a holding tank 14, the liquid in the holding tank first stage 12 is generally designated 15. The liquid 15 fills the holding tank first stage 12 and overflows a weir 17 into a second stage 19 wherein the liquid is generally designated 20.

A second collected stream generally shown by the box with the reference numeral 21 includes high solids containing effluents such as hide curing waste brines and other high fouling (agglomerated solids containing) wastes, including large dirt and manure particles. The high solids effluents indicated by the box 21 pass through conduit or line 22, so as to allow liquid streams having exceptionally high percentages of larger, flocculated or fouling solids therein to be deposited directly into the holding tank second stage 19.

Liquid 20 from the holding tank second stage 19 is withdrawn through a conduit or flow line 25 and pressurized by a pump 27, thereafter flowing through a flow line 29 to a separation or flotation vessel 31. Before entering the pump 27 a buffering or pH adjusting agent such as sodium carbonate designated by a flow line 35 is added to the liquid in line 25. It is foreseen that numerous compatible pH adjusting agents may be utilized for this purpose and a conventional pH adjusting or neutralizing system may be utilized to insure proper addition of the pH adjusting agent. Air is also added to the liquid line 25. The air may be added from a conventional air compressor or, alternatively, a slip stream of the fluid in the line 29 may be rerouted to the line 25 through a venturi (not shown) which is allowed to suck air thereinto in a well known manner. A flocculating agent is added to the liquid stream in the line 29. Preferably, the pressure in the line 29 after the pump 27 is in the nature of 40 pounds per square inch and this is reduced to somewhat slightly above atmospheric pressure at a letdown valve 37 prior to addition of the flocculating agent. The flocculating agent may be one of those agents typically used in a clarifier or the like and may include ferric chloride, alum, various organic polymers, or preferably ferric sulfate as designated by a flow line 39.

The flotation vessel 31 may be any suitable vessel for allowing the liquid stream in the line 29 to separate in two phases therein. In particular, there is a lower phase 41 which is relatively low in suspended solids and an upper phase 42 which is relatively high in suspended solids and is generally referred to as wet solids. The phases are generally separated by an interface 44.

The liquid in the line 29 preferably enters the flotation vessel 31 tangentially along the interior of an open ended arcuate distribution surface or, as illustrated, a truncated cone 45. The cone 45 is laterally centered within the vessel 31 and positioned in the lower liquid phase 41. The purpose of the cone 45 is to reduce the velocity of the incoming stream from the line 29 and to generally reduce agitation within the flotation vessel 31. Upon entry of the liquid stream in the line 29 into the flotation vessel 31, it is believed that the air and the flocculating agent previously injected into the waste water tends to agglomerate and make buoyant particles of the suspended solids so as to urge the suspended solids to float on top of a lower liquid which is relatively free of suspended solids. In the illustrated embodiment, the suspended solids entering the flotation vessel 31 with the liquid stream in line 29 tend to float to the interface 41 and thereafter become part of the wet solids phase 42.

A stand pipe 50 flow communicates with the fluid in the lower liquid phase 41, so as to allow overflow of liquid from the liquid phase 41 through outlet 51 and in this manner to maintain the interface 44 at a relatively constant position or level relative to the flotation tank 31. The overflow from the outlet 51 is gathered by a collector 52 and is sent to a sewer or the like through line 53.

The wet solids 42 overflow the flotation tank 31 through a chute 58 and are deposited on a continuous belt 60 of a dual continuous belt filter generally illustrated by dash lines and designated by the reference numeral 62. The wet solids on the belt 60 are generally designated by the numeral 63. In the illustrated embodiment, the filter 62 includes a second continuous belt 64 which engages the belt 60 at a common interface 65.

The belt 60 is provided with a drive roller 68 and suitable free rollers 69 to motivate and guide same. Likewise the belt 64 is provided with a suitable drive roller 70 and free roller 71 to motivate and guide same. The belts 60 and 64 are generally porous in nature and allow passage of liquid therethrough while restricting passage of solids. Liquid which passes freely through the porous belt 60 from the wet solids 63 placed thereon is gathered by a collection pan 74. The solids minus a certain amount of fluid, are then passed between the belts 60 and 64 so as to be squeezed or compressed therebetween at the interface 65 thereof. A remaining portion of liquid is thereby urged from the wet solids and gathered by a collection pan 76. The liquid collected by the collection pans 74 and 76 are integrated into a common stream which flows through the line 80 to a sewer or the like. The solids remaining between the belts 60 and 64 after removal of liquid therefrom tend to form a cake and are urged from the belts by doctor blades or scrapers 83 and 84 respectively. The solids 82 are collected in a vessel 86 for future disposition.

Typically, a certain amount of the solids 82 are not removed from the belts 60 and 64 by the scrapers 83 and 84, especially that portion of the solids 82 within the filter media or porous makeup of the belts 60 and 64. If the solids within the pores of the belts 60 and 64 partly or totally occlude the passage of liquid therethrough and are not removed, the liquid within the solids will not easily pass through such belts thereby reducing the effectiveness of the filter 62. Therefore, the waste water 15 is withdrawn from the holding tank 14 through a line 88, pressurized by a pump 89 and thereafter passed through a line 90 to two sets of backwashing nozzles 92 and 93 each being associated with the belts 60 and 64 respectively. The backwashing nozzles 92 and 93 spray waste water in a reverse direction to the side of the respective belt opposite the side thereof where solids are located and at a location removed from the interengagement of the belts 60 and 64 with the main portion of solids. In this manner, solids plugging or occluding pores of the belts are removed therefrom and collected in the waste water passing through the nozzles sets 92 and 93. Backwash collection pans 95 and 96 gather the waste water sprayed by the nozzle sets 92 and 93 respectively and the solids dislodged from the belts 60 and 64 respectively. The entire material gathered by the backwash collection pans 95 and 96 is conducted through a line 97 to a pump 98 and thereafter to line 99 to return to the holding tank first stage 12.

Thus, it can be seen that the fluid having passed through the process according to the present invention and partly exiting same through the lines 53 and 80 has a substantially reduced suspended solids content as compared to the fluid entering the system in the line 7. The solids collected in the vessel 86 may be returned to the rendering plant for additional processing or removed for disposal in a solid waste area.

A suitable dual belt continuous filter for the embodiment described is sold by the Parkson Company under the trademark Magnum Press. Although a dual belt continuous filter has been illustrated herein, it is foreseen that other filters could be suitably used for the present purpose, for instance, a horizontal belt vacuum filter.

It is noted that the waste water being utilized for backwashing the belts 60 and 64 may occasionally contain sufficient suspended solids to partially or totally block the nozzles in the distribution sets 92 and 93.

Therefore, it is preferred that the nozzles be of a self cleaning type, one example of such nozzle being known as a stamm nozzle having an inverted distribution port and an interior rotating brush.

In use of the above described process, it is seen that waste water is treated with a flocculating agent preferably after treatment thereof with a pH adjusting or buffering agent, preferably to a pH in the range from 5 to 9 especially 7 and injection thereinto of air. The waste water with flocculating agent therein is allowed to enter the flotation tank and separate into a lower liquid phase which is relatively low in suspended solids and an upper wet solids phase. The wet solids in the upper phase are allowed to overflow the flotation tank and be deposited upon a filter media. The filter media substantially separates solids in the wet solids from liquid contained therein. The solids are removed as a cake from the filter media. A backwash comprising incoming waste water in which solid particles are relatively small (emulsified) compared to flocculated solids removed by the filter media is utilized to clean remaining solids from the filter media after removal of the solids caked therefrom. The backwash with solids removed from the filter media entrained therein is returned to the start of the process. Liquid having substantially lower suspended solids content as compared to the waste water is removed from the process especially the flotation tank and directed to the sewer or the like.

It is to be understood that while certain embodiments of the present invention have been described and shown herein, it is not to be limited to specific forms or arrangement of parts herein described and shown.

What is claimed and desired to be secured by Letters Patent is:

1. A process for the removal of suspended solids from stick water exiting a rendering process comprising the steps of:
    (a) collecting said stick water in a holding region;
    (b) treating a first flow of said stick water from said holding region with a flocculating agent;
    (c) placing said stick water having been treated with said flocculating agent into a vessel;
    (d) allowing formation in said vessel of a lower liquid phase having a relatively low suspended solids content and an upper phase having a relatively high suspended solids content;
    (e) removing said upper phase from said vessel;
    (f) placing said upper phase after removal from said vessel onto a filter media such that liquid is removed therefrom and said suspended solids form a substantially liquid free solids cake;
    (g) removing a substantial portion of said solids cake from said filter media;
    (h) utilizing a second flow of said stick water from said holding region prior to treatment of the stick water with a flocculating agent to backwash said filter media; and
    (i) returning said stick water utilized to backwash said filter media to said holding region.

2. The process according to claim 1 wherein:
    (a) said filter media comprises engaging belts of a dual belt continuous filter adapted for separating liquid from the solids contained in said upper phase thereby producing a solids cake; and including the step of;
    (b) utilizing said stick water to backwash both of said dual belts after removal of said solids cake therefrom.

3. The process according to claim 1 or 2 wherein:
    (a) said flocculating agent is ferric sulfate; and including the steps of;
    (b) incorporating air and a buffering agent into said stick water before entry thereof into said vessel; and
    (c) injecting said first flow of stick water with said flocculating agent therein onto an open ended arcuate surface within said vessel, along a tangent of said surface whereby agitation within said vessel is minimized and said surface is located within said lower phase and laterally centered with respect to said vessel.

4. The process according to claim 3 wherein:
    (a) said surface comprises an interior of an open ended cone positioned within and spaced from said vessel; said cone diverging toward the top thereof; and including the step of;
    (b) injecting said first flow of stick water in a lower portion of said cone.

5. The process according to claim 1 wherein:
    (a) each of said steps are generally continuous in nature.

6. The process according to claim 1 including the steps of:
    (a) separating low solids stick water into a first portion of said holding region and high solids stick water into a second portion of said holding region; and
    (b) withdrawing said second flow of stick water for backwashing said filter media from said holding region first portion.

7. A process for the removal of suspended solids from stick water exiting a rendering process comprising the steps of:
    (a) collecting said stick water having a relatively low concentration of solids therein in a first portion of a holding region;
    (b) collecting said stick water having a relatively high concentration of solids therein in a second portion of a holding region;
    (c) treating a flow of said stick water from said holding region with a flocculating agent;
    (d) injecting air into said stick water generally in conjunction with adding said flocculating agent thereto;
    (e) injecting said stick water with flocculating agent and air therein into the interior of a cone structure within a vessel; said cone structure being open ended and flow communicating at both ends thereof with said vessel; said cone further being spaced from said vessel and diverging upwardly;
    (f) allowing the flow of stick water in said vessel to separate into a relatively heavy layer generally comprising clear water and a relatively light layer generally comprising flocculated suspended solids;
    (g) utilizing an overflow conduit communicating with said heavy layer to allow a portion of said heavy layer to exit said vessel and to control the height of an interface between said heavy and light layers within said vessel;
    (h) allowing a portion of said light layer to overflow said vessel;
    (i) conveying the light layer overflowing said vessel to a first stage of a dual belt continuous filter adapted for separating liquid from solids within light layer thereby producing a solids cake;

(j) removing a substantial portion of said solids cake from said filter first stage;
(k) utilizing a stick water flow from said holding region first portion before adding a flocculating agent thereto to backwash a second stage of said dual belt continuous filter; said backwashing being substantially continuous and simultaneous with the treatment of said light layer in said filter first stage; and
(l) returning the stick water used for backwashing to said holding region after backwash of said filter.

* * * * *